(12) United States Patent
Huang

(10) Patent No.: US 10,712,786 B1
(45) Date of Patent: Jul. 14, 2020

(54) MULTIFUNCTIONAL DEVICE

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 0 days.

(21) Appl. No.: 16/263,024

(22) Filed: Jan. 31, 2019

(51) Int. Cl.
| *G06F 1/16* | (2006.01) |
| *G06F 1/18* | (2006.01) |
| *H04M 1/02* | (2006.01) |
| *H04B 1/3883* | (2015.01) |
| *H04M 1/04* | (2006.01) |

(52) U.S. Cl.
CPC ............ *G06F 1/1684* (2013.01); *G06F 1/166* (2013.01); *G06F 1/1628* (2013.01); *G06F 1/1632* (2013.01); *G06F 1/1679* (2013.01); *G06F 1/183* (2013.01); *H04B 1/3883* (2013.01); *H04M 1/0262* (2013.01); *H04M 1/04* (2013.01)

(58) Field of Classification Search
CPC .... H04M 1/04; H04M 1/0262; H04B 1/3883; G06F 1/1632; G06F 1/1684; G06F 1/166
See application file for complete search history.

(56) References Cited

U.S. PATENT DOCUMENTS

| 7,425,080 B2 * | 9/2008 | Lin ..................... F21V 33/0052 |
| | | 362/253 |
| 7,837,160 B2 * | 11/2010 | Huang ................. G06F 1/1616 |
| | | 248/188.2 |
| 8,992,284 B2 * | 3/2015 | Weidetz ............... A63H 33/003 |
| | | 446/310 |
| 9,271,061 B1 * | 2/2016 | Amores ................ H04R 1/028 |
| 9,501,111 B1 * | 11/2016 | Huang .................... G06F 1/203 |
| 9,601,934 B2 * | 3/2017 | Ikegami ............... H02J 7/0042 |
| 9,979,147 B1 * | 5/2018 | Huang ...................... H02J 7/00 |
| 9,979,805 B1 * | 5/2018 | Huang ................ H04M 1/0262 |
| 2007/0014426 A1 * | 1/2007 | Sung ...................... G11B 31/02 |
| | | 381/386 |
| 2016/0352118 A1 * | 12/2016 | Huang .................. H02J 7/0042 |
| 2017/0219159 A1 * | 8/2017 | Wiebush, III .......... F16M 11/22 |

* cited by examiner

*Primary Examiner* — Nidhi Thaker
(74) *Attorney, Agent, or Firm* — Jackson IPG PLLC; Demian K. Jackson

(57) ABSTRACT

A multifunctional device includes a base (1), a housing (4) releasably secured to the base (1), a casing (2) concealed by the housing (4), and a toy (3) concealed by the casing (2). The base (1) includes a tray (13). The casing (2) includes first and second pad members (21, 22) arranged symmetrically. The second pad member (22) includes a ring member (24) having top projections (243) and recesses (244) alternating with the projections (243) and being complimentary to the projections (243) respectively. The toy (3) includes first and second half bodies (31, 32) arranged symmetrically, and a joining member (33). The toy (3) can be folded or unfolded. The housing (4) includes an open top (41), a blind bottom (42), a first flange (43) around the open top (41), and a second flange (44) around the blind bottom (42).

12 Claims, 18 Drawing Sheets

MULTIFUNCTIONAL DEVICE

BACKGROUND OF THE INVENTION

1. Field of the Invention

The invention relates to multifunctional devices and more particularly to such a multifunctional device capable of connecting to a notebook computer, a tablet computer or a mobile phone; charging, storing cables, serving as a support, dissipating heat, tilting for display purposes, illuminating, serving a pen container, or serving as an aquarium.

2. Description of Related Art

Consumer electronics are widely used in our daily life. For example, 3C (computer, communication, and consumer electronics) are very popular. 3C has the features of wide applications, easy operation and convenient in use. It is typical that mobile phones and computers are used by people everyday. Computers include personal computers (PCs), tablet computers and notebook computers.

Smartphones are the most advanced mobile phones. Mobile phones and computers have many same functions and applications. Typically, the mobile phones, the tablet computers and notebook computers have features including communication, photo taking, video playing, Internet access, application software performing and data storage. That is why these electronic products are called consumer electronics. For playing video or performing application software on a mobile phone, a tablet computer, or a notebook computer, the display is often inclined. Also, charging, Internet access and connections are required for mobile phones, tablet computers, notebook computers, digital cameras, external hard disks, and CD players. However, conventional techniques of charging, Internet access and connections often make connections messy. Further, poor heat dissipation is an issue to deal with.

Various problems and drawbacks associated with 3C are solved by U.S. Pat. No. 7,837,160 entitled "simple heat dissipation pad for notebook computer" to Huang, U.S. Pat. No. 9,979,147 entitled "multi-functional USB hub" to Huang, and U.S. Pat. No. 9,979,805 entitled "multi-functional apparatus for mobile phone and tablet computer" to Huang.

While the device enjoys its success in the market, continuing improvements in the exploitation of device of this type are constantly being sought.

SUMMARY OF THE INVENTION

It is therefore one object of the invention to provide a multifunctional device comprising comprising a base, a housing releasably secured to the base, a casing concealed by the housing, and a toy concealed by the casing wherein the base includes a base plate, a tray on the base plate, a printed circuit board PCB on the tray, and a cover releasably secured to the base plate to conceal both the PCB and the tray; the cover includes a circular cavity on a top, and a closed groove on edges of the top; the PCB includes a DC connector and a plurality of USB ports; the tray includes two slides on two sides respectively, and a handle on a front end so that the tray is configured to push into the base or pull out of the base to position the handle at one of a plurality of distances from the base; after the tray has been pulled out, a tablet computer or a mobile phone is configured to tilt on a gap between the handle and the base; the casing includes first and second pad members, arranged symmetrically; the second pad member includes a hollow half spherical member having an internal space, a hollow half spherical element complementarily disposed in the space and having an internal space and a plurality of wells on an outer surface; and a ring member including a central hole, a plurality of latches on a bottom, a plurality of projections on a top, and a plurality of recesses alternating with the projections and being complimentary to the projections respectively; the latches are fastened in the wells to fasten the hollow half spherical element, the hollow half spherical member, and the ring member together; the first and second pad members, are configured to separate from each other and place below a rear end of a bottom of a notebook computer, the tablet computer, or the mobile phone so as to tilt the notebook computer, the tablet computer, or the mobile phone; the toy is disposed in the space and includes first and second half bodies, arranged symmetrically, and a joining member; the first half body includes two opposite rotary bearings on a bottom, an intermediate groove, and an upper groove; the joining member includes first and second pivots, on either end and disposed in the rotary bearings, to assemble the first and second half bodies, and the joining member so that the toy is configured to unfold or fold; when the toy is folded, a cable is configured to wind around the intermediate groove and the upper groove of each of the first and second half bodies; and when the toy is unfolded, the tablet computer or the mobile phone is configured to rest on the intermediate groove of one of the first and second half bodies; the housing includes an open top, a blind bottom, a first flange around the open top, and a second flange around the blind bottom; and the second flange is fitted in the groove to secure the housing and the base together.

The above and other objects, features and advantages of the invention will become apparent from the following detailed description taken with the accompanying drawings.

DETAILED DESCRIPTION OF THE INVENTION

Referring to FIGS. 1 to 27, a multifunctional device in accordance with the invention is shown.

Figure 1:
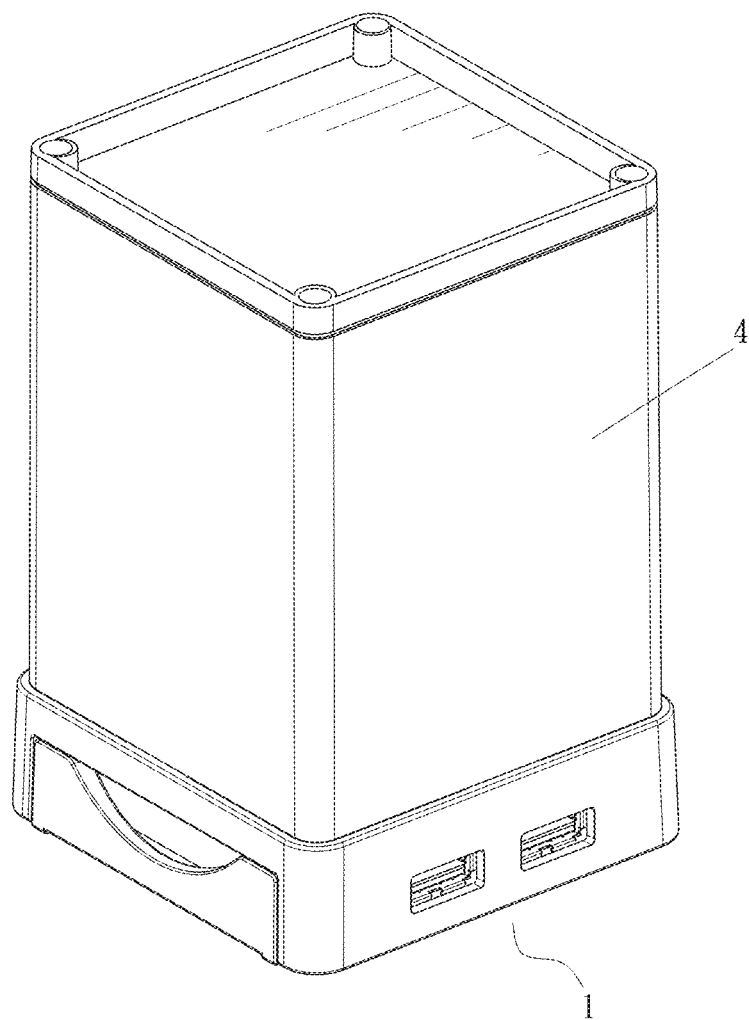
FIG. 1 is a perspective view of a multifunctional device according to the invention.
Figure 2:
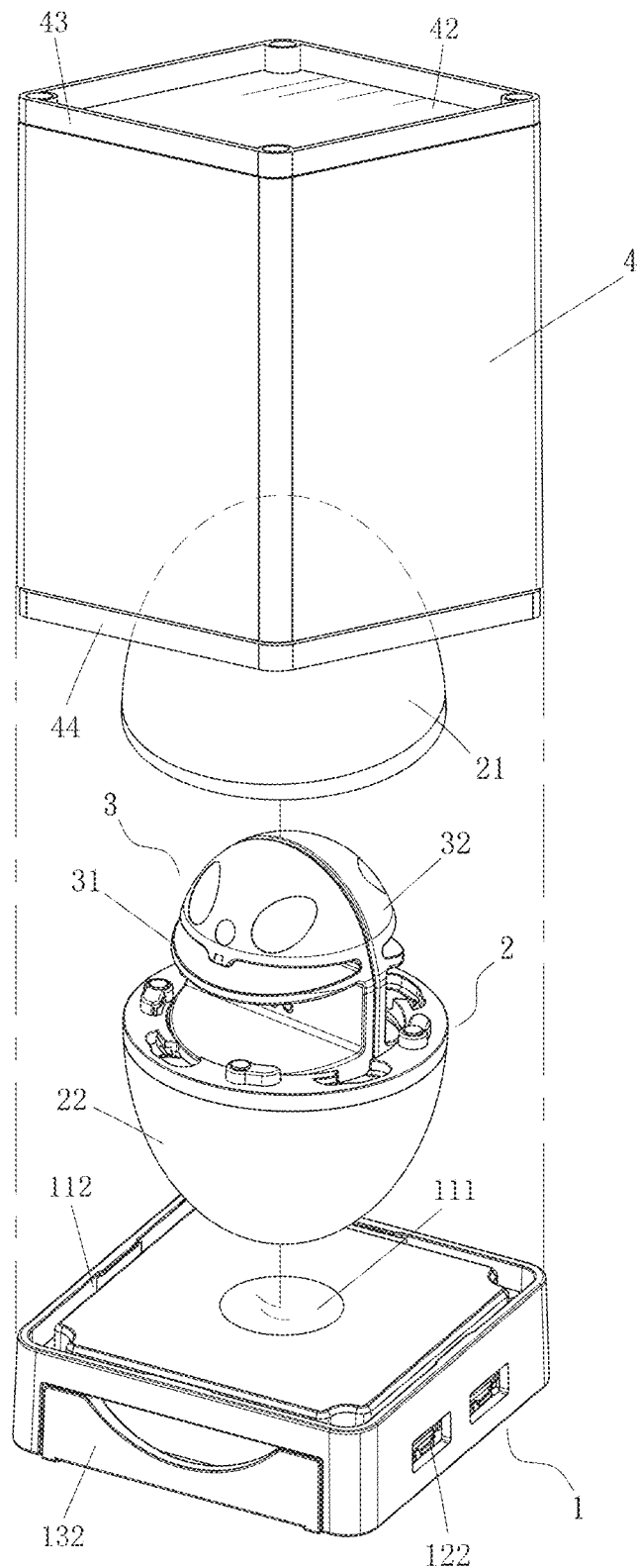
FIG. 2 is an exploded perspective view of the multifunctional device.
Figure 3:
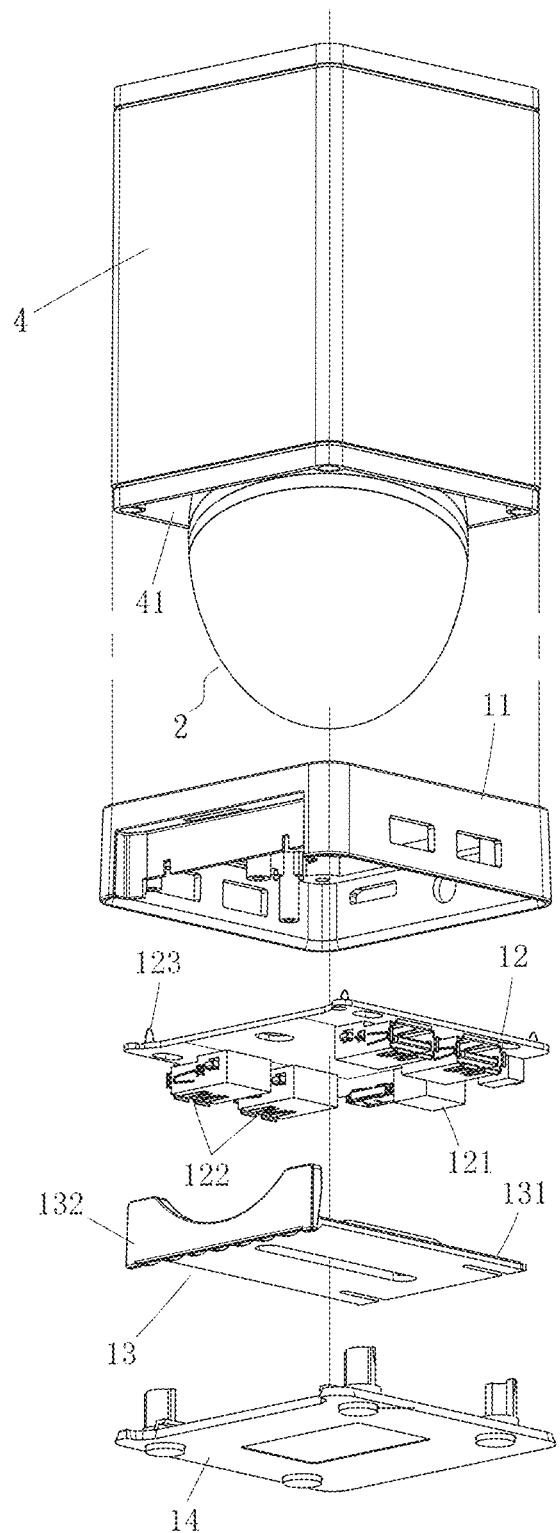
FIG. 3 is another exploded perspective view of the multifunctional device with the base being exploded.

As shown in FIGS. 1 to 3 specifically, the multifunctional device comprises a base 1, a housing 4 releasably secured to the base 1, a casing 2 concealed by the housing 4, and a toy 3 concealed by the casing 2 as discussed in detail below.

The base 1 includes a base plate 14, a tray 13 on the base plate 14, a printed circuit board (PCB) 12 on the tray 13, and a cover 11 releasably secured to the base plate 14 to conceal both the PCB 12 and the tray 13. The cover 11 includes a circular cavity 111 on the center of a top, and a closed groove 112 on four edges of the top. The PCB 12 includes a direct current (DC) connector 121, a plurality of Universal Serial Bus (USB) ports 122 and a light-emitting diode (LED) 123. The tray 13 includes two slides 131 on two sides respectively, and a handle 132 on a front end. Thus, the tray 13 may be pulled out of the base 1 or pushed into the base 1 in a sliding manner.

Figure 4:
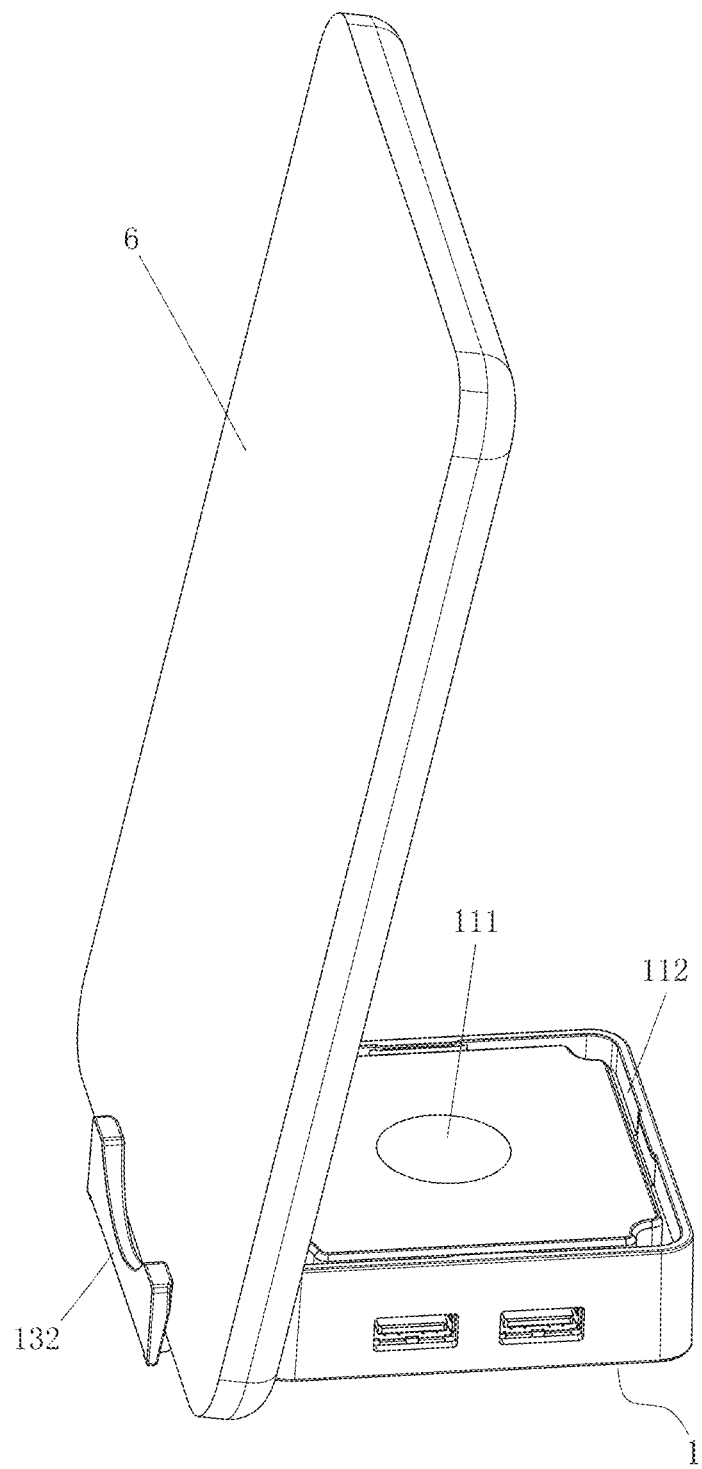
FIG. 4 is a perspective view showing the base of the multifunctional device served as a holder to support an inclined tablet computer by pulling out the tray.
Figure 5:
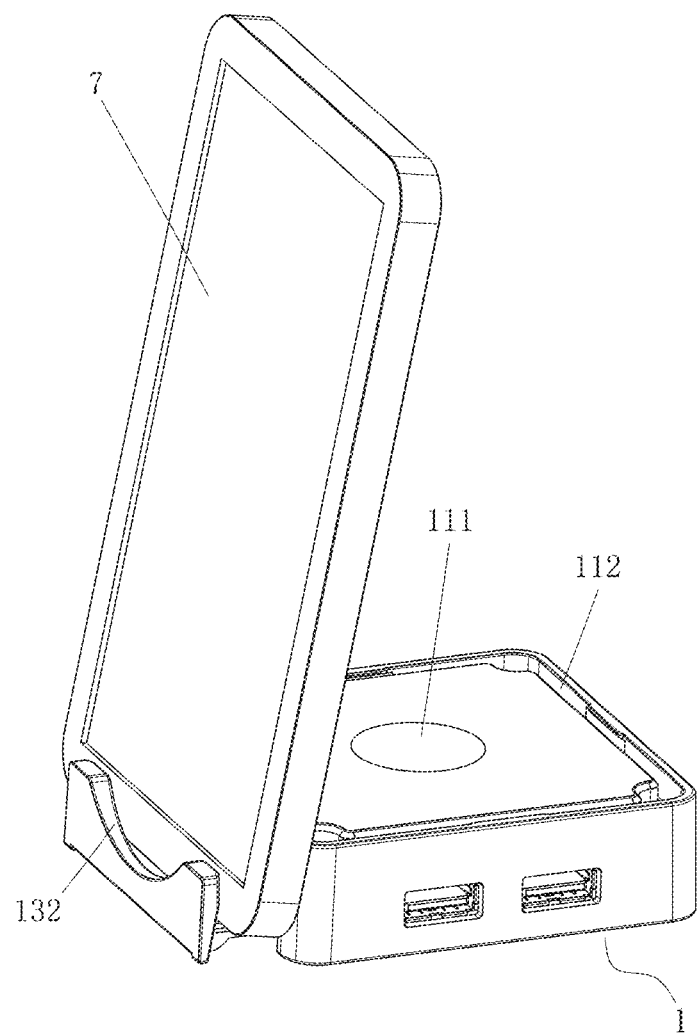
FIG. 5 is a view similar to FIG. 4 showing an inclined mobile phone supported by both the tray and the base.
Figure 6:
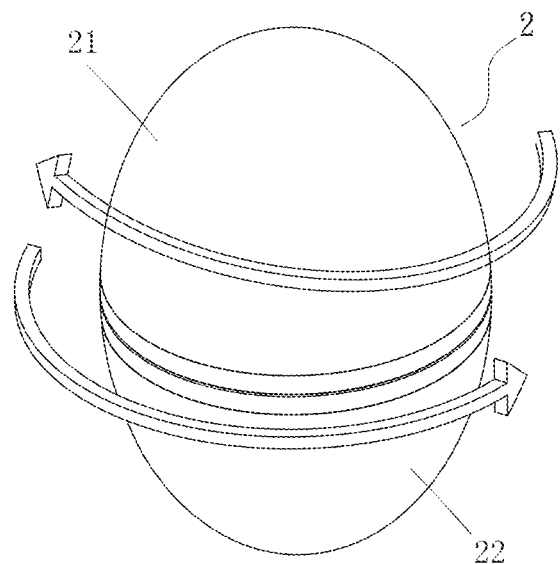
FIG. 6 is a perspective view of the casing.
Figure 7:
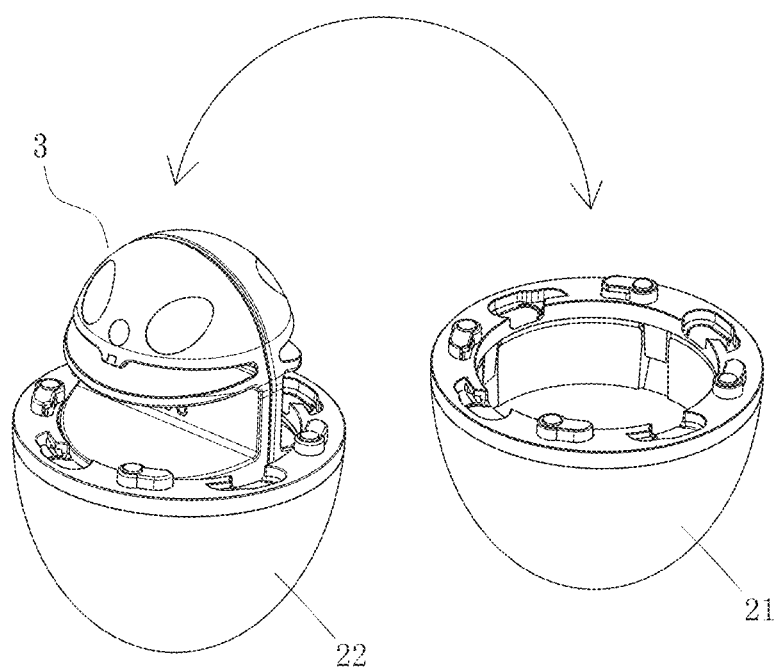
FIG. 7 is an exploded perspective view of the casing.
Figure 8:
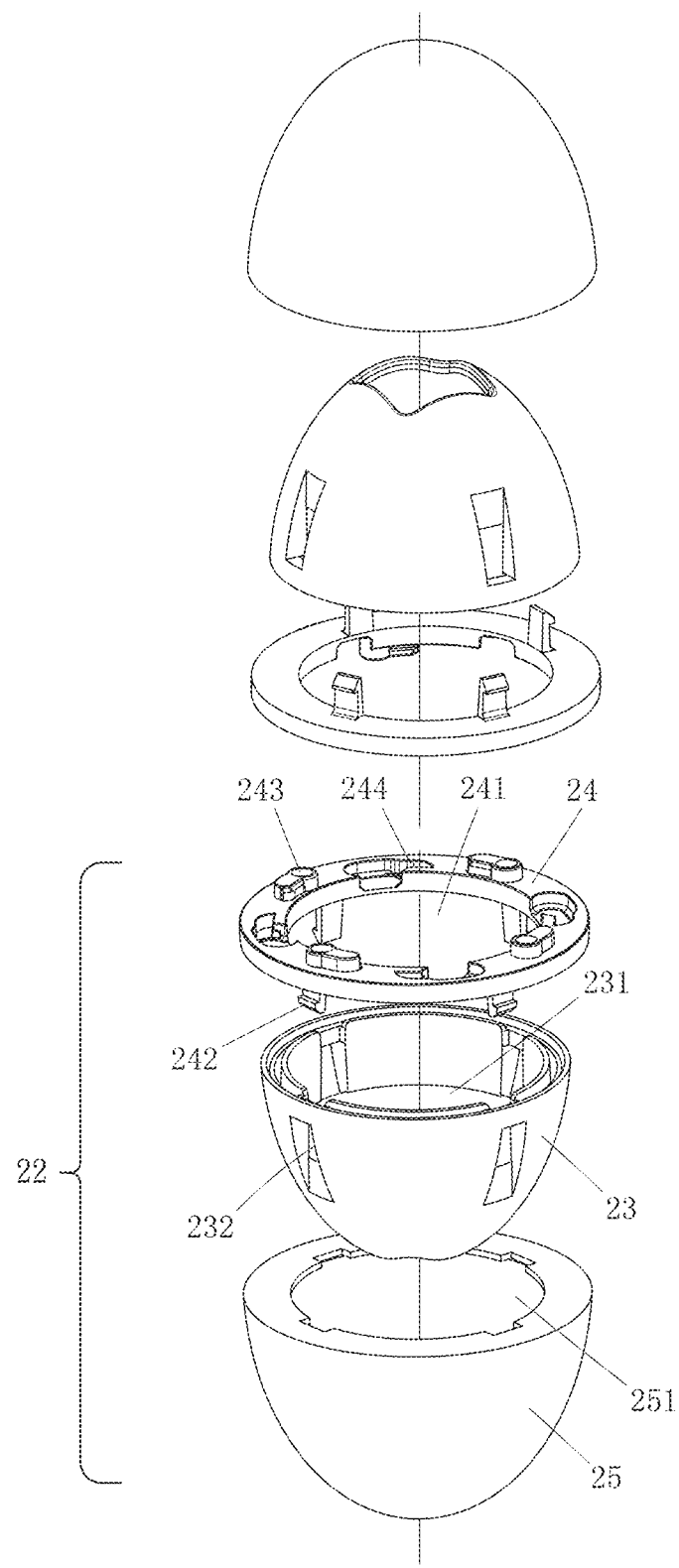
FIG. 8 is an exploded view of the casing.
Figure 9:
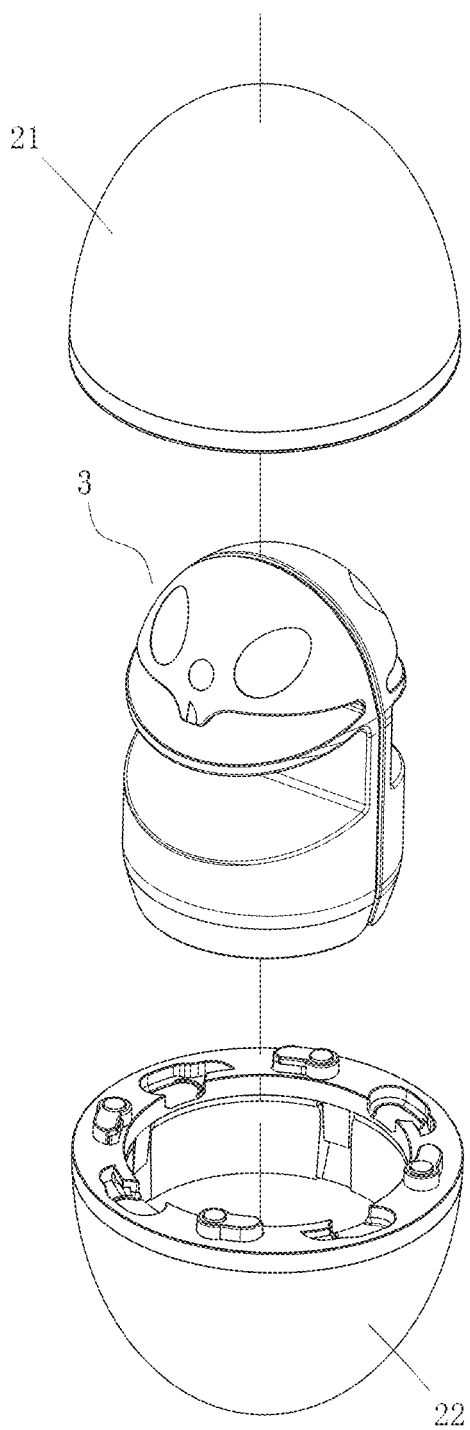
FIG. 9 is an exploded perspective view showing the toy to be installed in the casing.

As shown in FIGS. 4 and 5 specifically, after the casing 2, the toy 3 and the housing 4 have been removed and the tray 13 has been pulled out, a tablet computer 6 or a mobile phone 7 can be placed slantingly in a gap between the handle 132 and the base 1 for support and display purposes. The handle 132 of the pulled tray 13 can be positioned at one of a plurality of distances from the base 1. Thus, either the tablet computer 6 or the mobile phone 7 can be tilted at one of a plurality of different angles.

As shown in FIGS. 6 to 9 specifically, the casing 2 includes symmetrical first and second pad members 21 and 22. The pad members 21 and 22 are assembled to form a complete heat dissipation pad. The second pad member 22 includes a hollow half spherical member 25 having an internal space 251; a hollow half spherical element 23 complementarily disposed in the space 151 and having an internal space 231 and a plurality of wells 232 on an outer surface; and a ring member 24 including a central hole 241, a plurality of latches 242 on a bottom, a plurality of projections 243 on a top, and a plurality of recesses 244 alternating with the projections 243. The first pad member 21 has the same components as the second pad member 22.

The latches 242 are fastened in the wells 232 to fasten the hollow half spherical element 23, the hollow half spherical member 25 and the ring member 24 together. As a result, either the first pad member 21 or the second pad member 22 is assembled. Moreover, the projections 243 of the second pad member 22 are complementarily disposed in the recesses of the first pad member 21, and the projections of the first pad member 21 are complementarily disposed in the recesses 244 of the second pad member 22. As a result, a complete casing 2 is formed.

Figure 10:
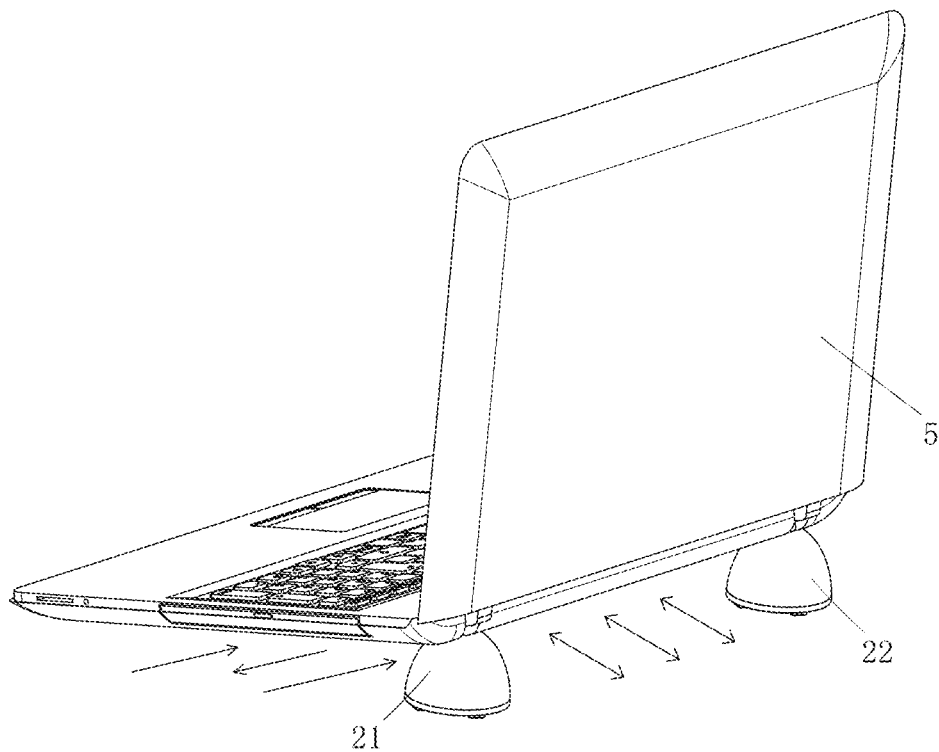
FIG. 10 is a perspective view showing a notebook computer being partially supported by the first and second pad members for displaying and heat dissipation purposes.
Figure 11:
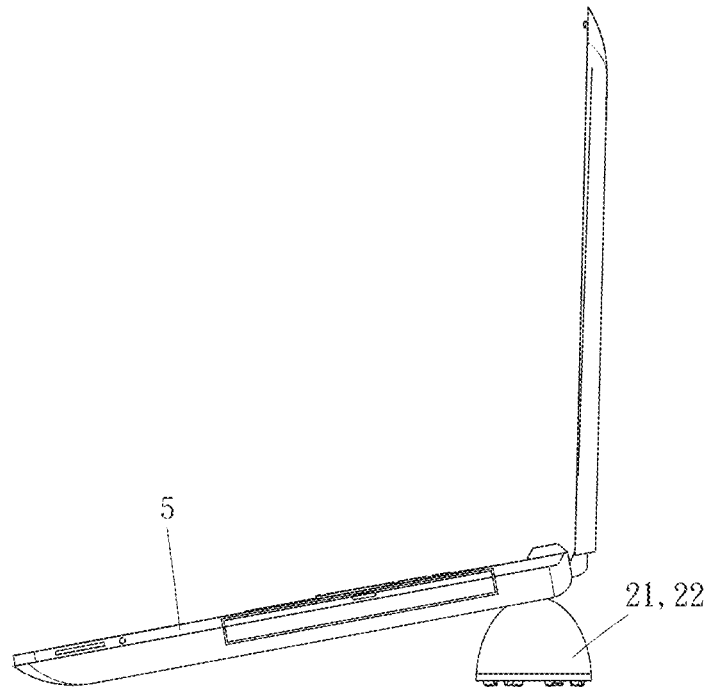
FIG. 11 is a side elevation of FIG. 10.
Figure 12:
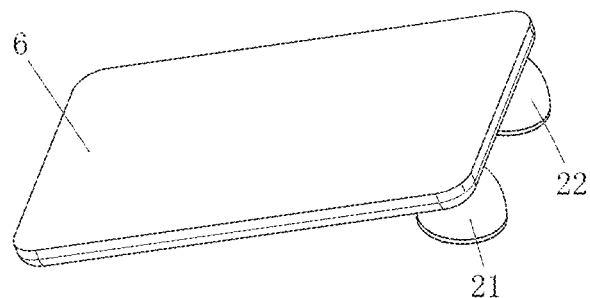
FIG. 12 is a perspective view showing a tablet computer being partially supported by the first and second pad members for displaying and heat dissipation purposes.
Figure 13:
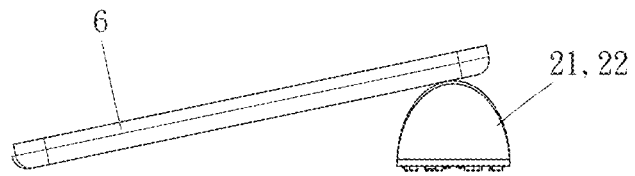
FIG. 13 is a side elevation of FIG. 12.
Figure 14:
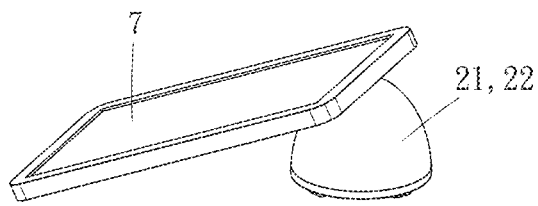
FIG. 14 is a perspective view showing a mobile phone being partially supported by the first and second pad members for displaying and heat dissipation purposes.
Figure 15:
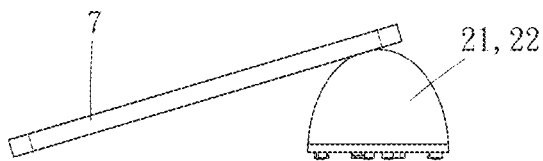
FIG. 15 is a side elevation of FIG. 14.
Figure 16:
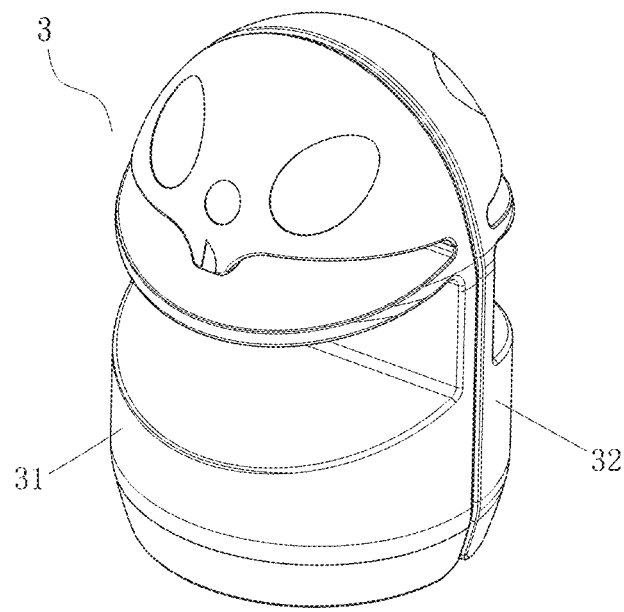
FIG. 16 is a perspective view of the toy.
Figure 17:
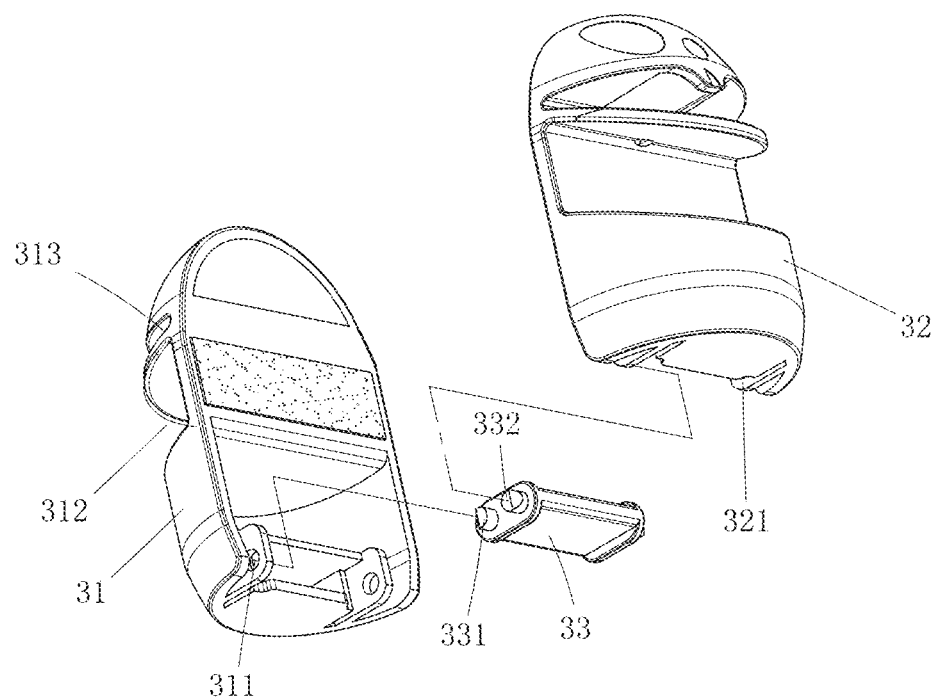
FIG. 17 is an exploded view of the toy.
Figures 18, 19:
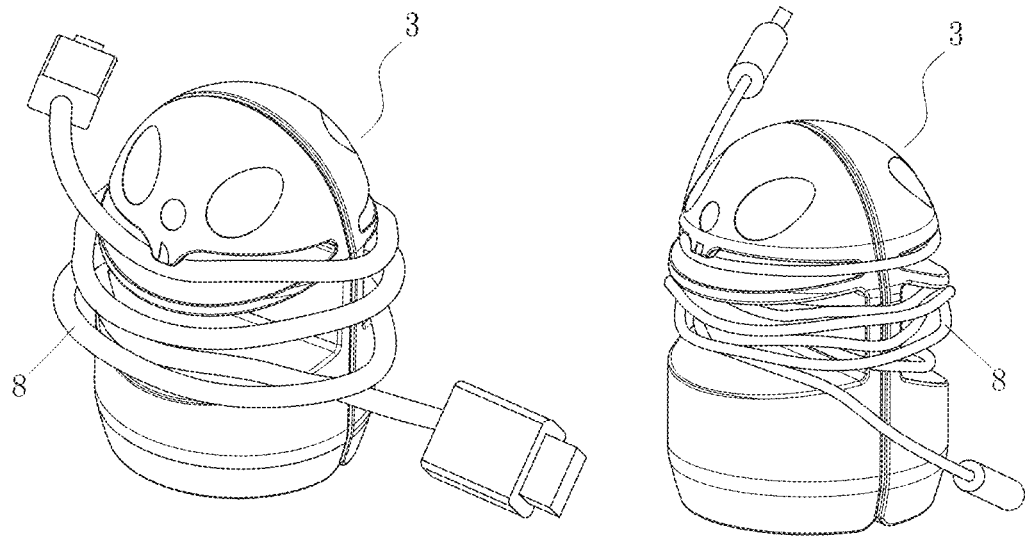
FIG. 18 is a perspective view showing cable being wound around the toy for storage.
FIG. 19 is another perspective view showing cable being wound around the toy for storage.

As shown in FIGS. 10 and 11 specifically, the first and second pad members 21 and 22 can be separated from each other and placed below a rear end of a bottom of a notebook computer 5 with the projections rested on a table. Thus, the notebook computer 5 tilted. As shown in FIGS. 12 to 15, the same arrangement is applicable to either a tablet computer 6 (FIGS. 12 and 13) or a mobile phone 7 (FIGS. 14 and 15). In each of the above three arrangements, a sufficient heat dissipation of the notebook computer 5, the tablet computer 6 or the mobile phone 7 is achieved.

As shown in FIGS. 16 to 19, the toy 3 is disposed in the space 231 and includes symmetrical first and second half bodies 31 and 32, and a joining member 33. In detail, the first half body 31 includes two opposite rotary bearings 311 on a bottom, an intermediate groove 312, and an upper groove 313. The first half body 32 also includes two opposite rotary bearings 321 on a bottom, an intermediate groove (not numbered), and an upper groove (not numbered). The joining member 33 includes first and second pivots 331 and 332 on either end. The first and second pivots 331 and 332 are disposed in the rotary bearings 311 and 322 to assemble the first and second half bodies 31 and 32 and the joining member 33. As a result, a complete toy 3 is formed. Further, a cable 8 may be wound around the intermediate groove 312 and the upper groove 313 of the first half body 31 and around the intermediate groove and the upper groove of the second half body 32 for storage.

Figure 20:
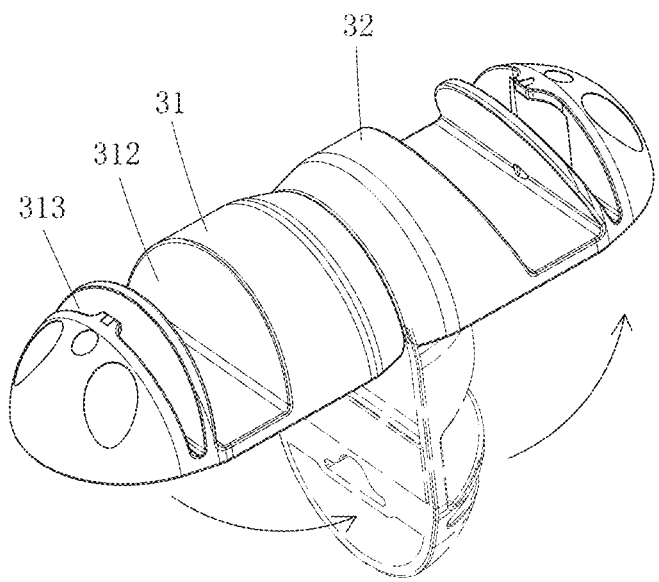
FIG. 20 is a perspective view showing steps of unfolding the toy so that the toy may be stand on a flat surface.
Figure 23:
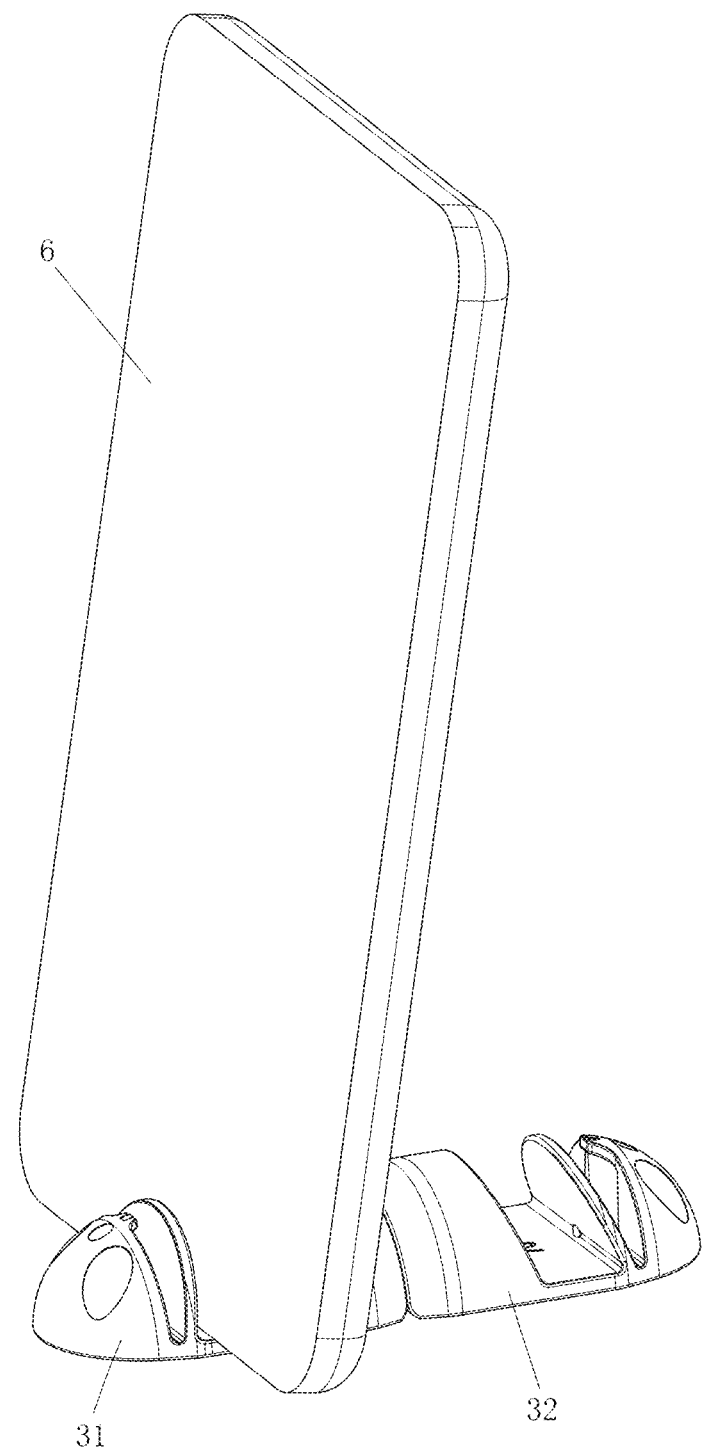
FIG. 23 is a perspective view showing an inclined tablet computer being supported by the intermediate groove of the first half body.
Figure 24:
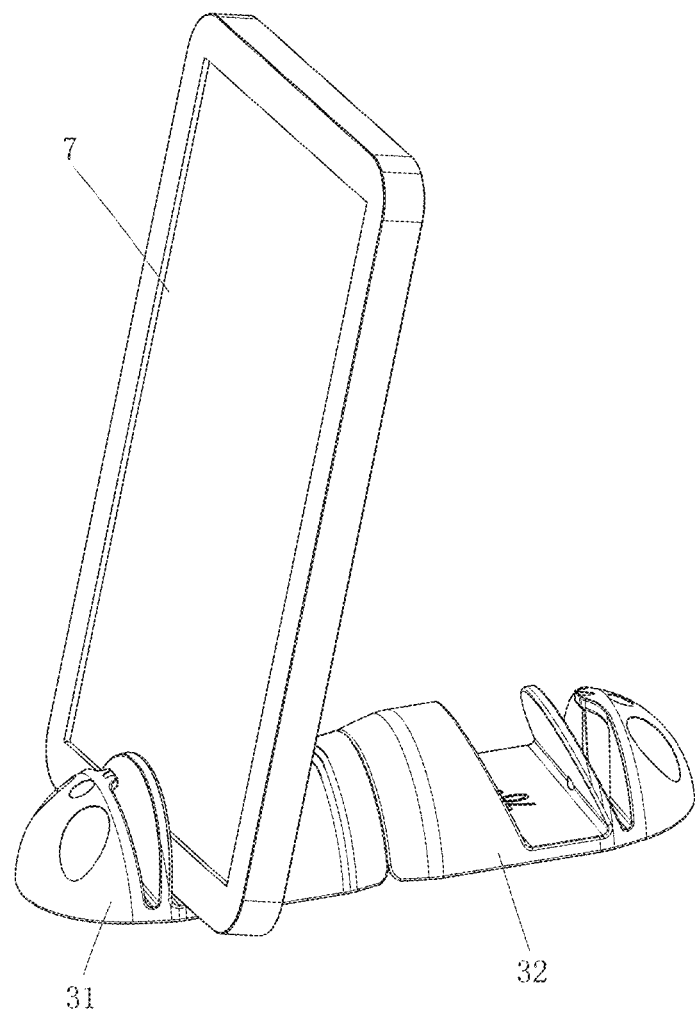
FIG. 24 is a perspective view showing an inclined mobile phone being supported by the intermediate groove of the first half body.

As shown in FIGS. 20, 23 and 24 specifically, the second half body 32 may be pivoted about the first and second pivots 331 and 332 to dispose at an angle of 180 degrees with respect to the first half body 31 so that the toy 3 stands with the flat surfaces of the first and second half bodies 31 and 32 rested on a flat surface. Further, the tablet computer 6 or the mobile phone 7 may be rested on the intermediate groove 312 of one of the first and second half bodies 31 and 32.

Figure 21:
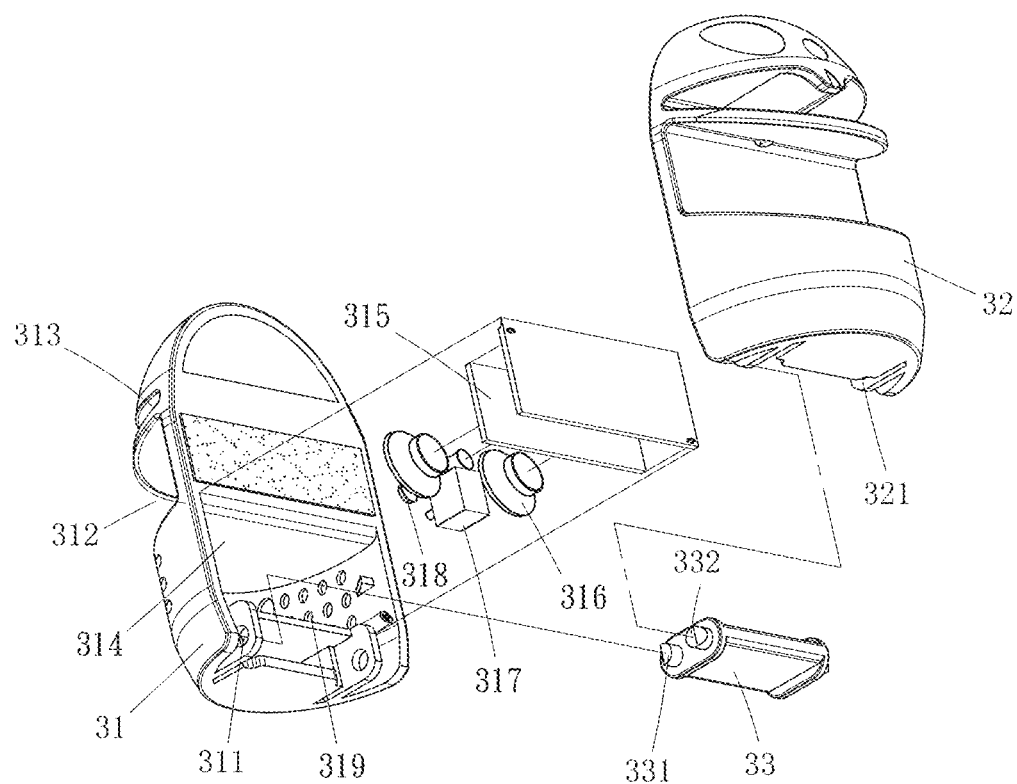
FIG. 21 is an exploded view showing components including a Bluetooth speaker in the toy.
Figure 22:
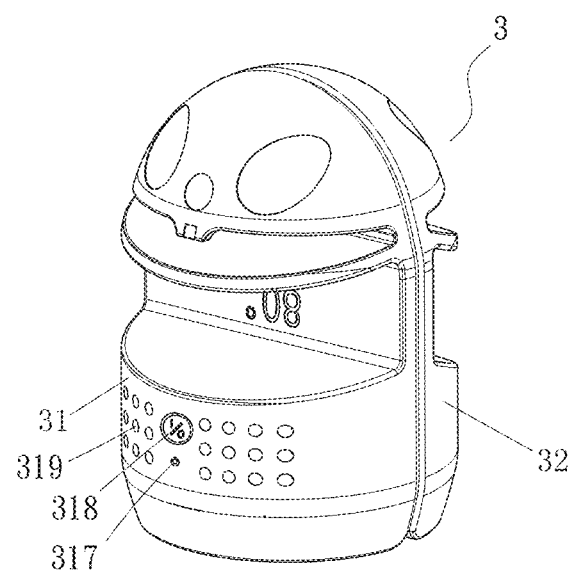
FIG. 22 is a perspective view of the assembled toy of FIG. 21.

As shown in FIGS. 21 and 22 specifically, the first half body 31 further comprises a compartment 314 for the installation of a PCB 315, two Bluetooth speakers 316, a rechargeable battery 317, and an on/off switch 318. Further, a plurality of apertures 319 are provided on an outer surface of the first half body 31, and the on/off switch 318 has a push button provided on the outer surface of the first half body 31. Furthermore, the PCB 315 is downloaded with a Bluetooth driver. Thus, the toy 3 can play music by activating the PCB 315.

Figure 25:
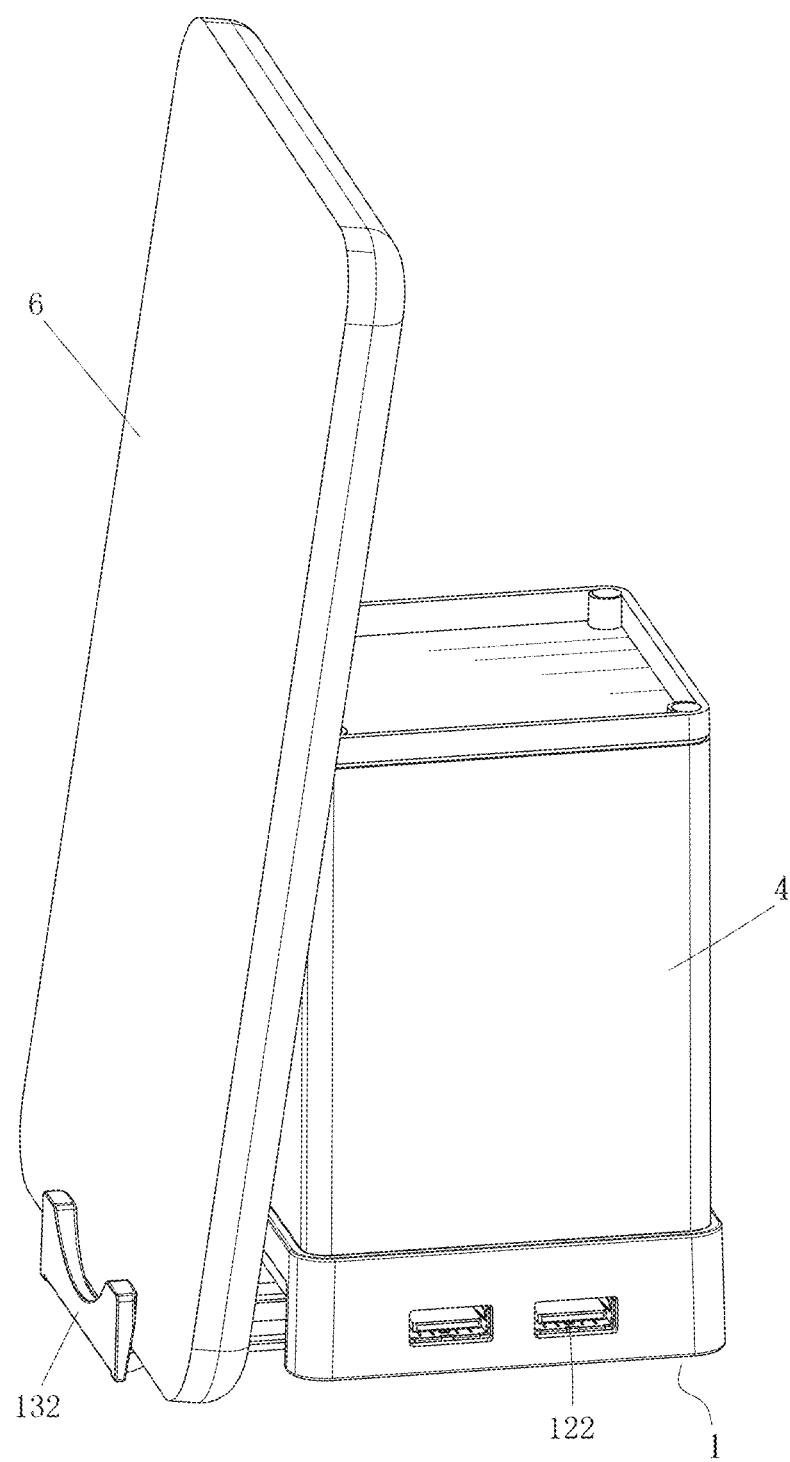
FIG. 25 is a perspective view showing an inclined tablet computer being supported by the pulled out tray and the housing.
Figure 26:
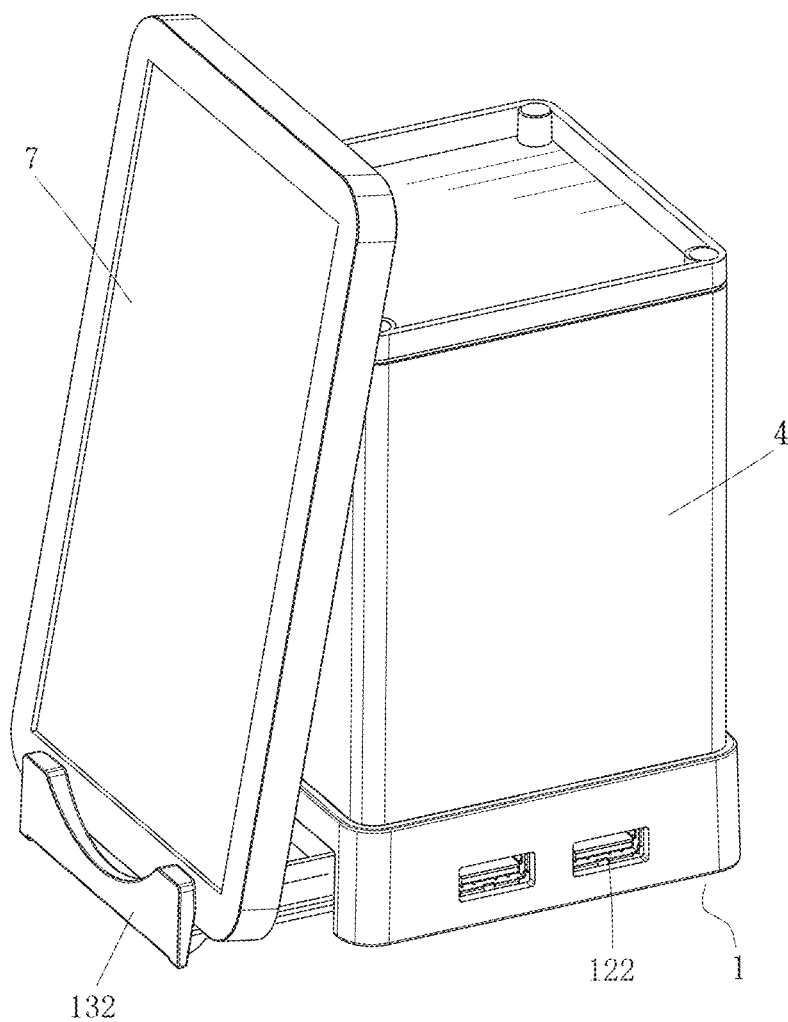
FIG. 26 is a perspective view showing an inclined mobile phone being supported by the pulled out tray and the housing.
Figure 27:
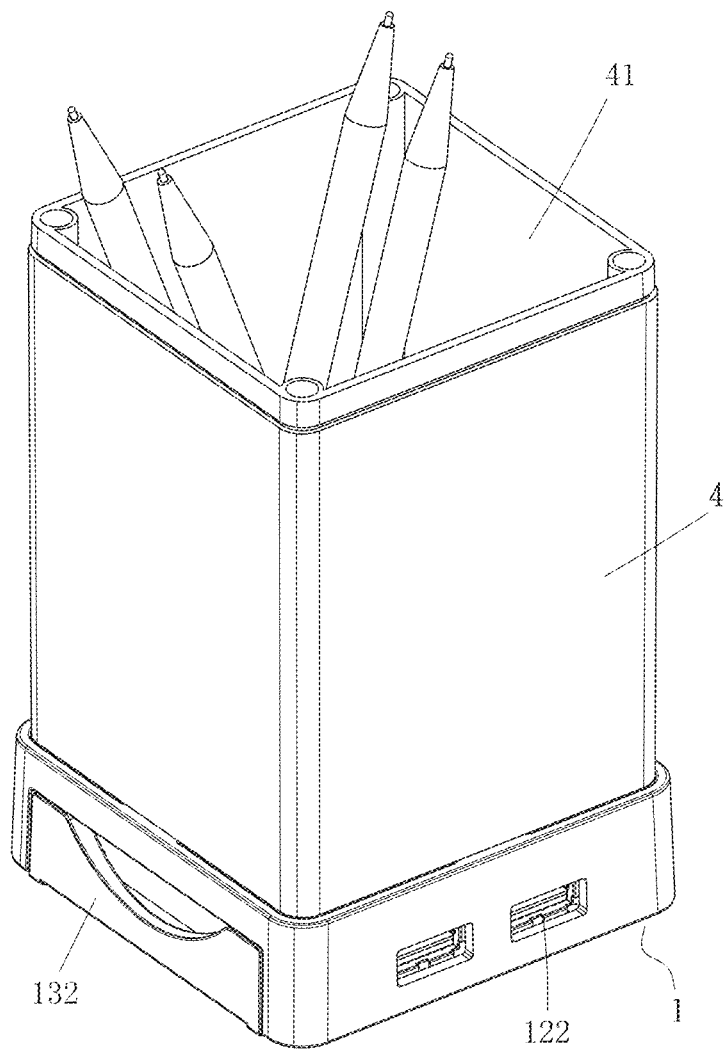
FIG. 27 is a perspective view showing the multifunctional device being served as a pen container.

As shown in FIGS. 25, 26 and 27 specifically, the housing 4 includes an open top 41, a blind bottom 42, a first flange 43 around the open top 41, and a second flange 44 around a blind bottom 42. The second flange 44 is fitted in the groove 112 so that the housing 4 may be served as a container for storing pens (see FIG. 27). Alternatively, the housing 4 is served as an aquarium. A tablet computer 6 can be placed slantingly in a gap between the handle 132 and the base 1 for support and display purposes (see FIG. 25). A mobile phone 7 can be placed slantingly in a gap between the handle 132 and the base 1 for support and display purposes (see FIG. 26).

The housing 4 is formed of transparent plastic. When the housing 4 is disposed upside down, the casing 2 is concealed by the housing. Moreover, the LED 123 may illuminate to serve as a light in the night.

It is envisaged by the invention that the multifunctional device is capable of connecting to a notebook computer, a tablet computer or a mobile phone; charging, storing cables, serving as a support, dissipating heat, tilting for display purposes, illuminating, serving a pen container, or serving as an aquarium.

While the invention has been described in terms of preferred embodiments, those skilled in the art will recognize that the invention can be practiced with modifications within the spirit and scope of the appended claims.

What is claimed is:

1. A multifunctional device, comprising a base (1), a housing (4) releasably secured to the base (1), a casing (2) concealed by the housing (4), and a toy (3) concealed by the casing (2) wherein:

the base (1) includes a base plate (14), a tray (13) on the base plate (14), a printed circuit board (PCB) (12) on the tray (13), and a cover (11) releasably secured to the base plate (14) to conceal both the PCB (12) and the tray (13);

the cover (11) includes a circular cavity (111) on a top, and a closed groove (112) on edges of the top;

the PCB (12) includes a direct current (DC) connector 1(21) and a plurality of Universal Serial Bus (USB) ports (122);

the tray (13) includes two slides (131) on two sides respectively, and a handle (132) on a front end so that the tray (13) is configured to push into the base (1) or pull out of the base (1) to position the handle (132) externally of the base (1);

after the tray (13) has been pulled out, a tablet computer (6) or a mobile phone (7) is configured to position and tilt on a gap between the handle (132) and the base (1);

the casing (2) includes first and second pad members (21, 22) arranged symmetrically;

the second pad member (22) includes a hollow half spherical member (25) having an internal space (251), a hollow half spherical element (23) complementarily disposed in the space (151) and having an internal space (231) and a plurality of wells (232) on an outer surface; and a ring member (24) including a central hole (241), a plurality of latches (242) on a bottom, a plurality of projections (243) on a top, and a plurality of recesses (244) alternating with the projections (243) and being complimentary to the projections (243) respectively;

the latches (242) are fastened in the wells (232) to fasten the hollow half spherical element (23), the hollow half spherical member (25), and the ring member (24) together;

the first and second pad members (21, 22) are configured to separate from each other and place below a rear end of a bottom of a notebook computer (5), the tablet computer (6), or the mobile phone (7) so as to tilt the notebook computer (5), the tablet computer (6), or the mobile phone (7);

the toy (3) is disposed in the space (231) and includes first and second half bodies (31, 32) arranged symmetrically, and a joining member (33);

the first half body (31) includes two opposite rotary bearings (311) on a bottom, an intermediate groove (312), and an upper groove (313);

the joining member (33) includes first and second pivots (331, 332) on either end and disposed in the rotary bearings (311, 322) to assemble the first and second half bodies (31, 32) and the joining member (33) so that the toy (3) is configured to unfold or fold;

when the toy (3) is folded, a cable (8) is configured to wind therearound;

when the toy (3) is unfolded, the tablet computer (6) or the mobile phone (7) is configured to rest on the intermediate groove (312) of one of the first and second half bodies (31, 32);

the housing (4) includes an open top (41), a blind bottom (42), a first flange (43) around the open top (41), and a second flange (44) around the blind bottom (42); and the second flange (44) is fitted in the groove (112) to secure the housing (4) and the base (1) together.

2. The multifunctional device of claim 1, wherein the pulled out handle (132) is disposed at one of a plurality of distances from the base (1) so that the tablet computer (6) or the mobile phone (7) is configured to position and tilt on a gap between the handle (132) and the base (1).

3. The multifunctional device of claim 1, wherein when the toy (3) is folded, the cable (8) is configured to wind around the intermediate groove (312) and the upper groove (313) of each of the first and second half bodies (31, 32).

4. The multifunctional device of claim 1, wherein each of the intermediate groove (312) and the upper groove (313) has one of a different widths.

5. The multifunctional device of claim 1, wherein the first half body (31) further comprises a compartment (314) for mounting a PCB (315), a plurality of loudspeakers (316), a rechargeable battery (317), an on/off switch (318), and a plurality of apertures (319) on an outer surface of the first half body (31).

6. The multifunctional device of claim 1, wherein the housing (4) is configured to dispose upside down.

7. The multifunctional device of claim 1, wherein the housing (4) is formed of transparent plastic; and wherein the PCB (12) further comprises a light-emitting diode (LED).

8. A multifunctional device, comprising a base (1) and a housing (4) releasably secured to the base (1) wherein:

the base (1) includes a base plate (14), a tray (13) on the base plate (14), a printed circuit board (PCB) (12) on the tray (13), and a cover (11) releasably secured to the base plate (14) to conceal both the PCB (12) and the tray (13);

the cover (11) includes a circular cavity (111) on a top, and a closed groove (112) on edges of the top;

the PCB (12) includes a direct current (DC) connector 1(21) and a plurality of Universal Serial Bus (USB) ports (122);

the tray (13) includes two slides (131) on two sides respectively, and a handle (132) on a front end so that the tray (13) is configured to push into the base (1) or pull out of the base (1) to position the handle (132) at one of a plurality of distances from the base (1);

after the tray (13) has been pulled out, a tablet computer (6) or a mobile phone (7) is configured to position and position and tilt on a gap between the handle (132) and the base (1);

the housing (4) includes an open top (41), a blind bottom (42), a first flange (43) around the open top (41), and a second flange (44) around the blind bottom (42); and the second flange (44) is fitted in the groove (112) to secure the housing (4) and the base (1) together.

9. The multifunctional device of claim 8, wherein the pulled out handle (132) is disposed at one of a plurality of distances from the base (1) so that the tablet computer (6) or the mobile phone (7) is configured to position and tilt on a gap between the handle (132) and the base (1).

10. The multifunctional device of claim 8, wherein the housing (4) is configured to dispose upside down.

11. The multifunctional device of claim 8, wherein the housing (4) is formed of transparent plastic; and wherein the PCB (12) further comprises a light-emitting diode (LED).

12. A multifunctional device, comprising a casing (2) including first and second pad members (21, 22) arranged symmetrically wherein the second pad member (22) includes a hollow half spherical member (25) having an internal space (251), a hollow half spherical element (23) complementarily disposed in the space (151) and having an internal space (231) and a plurality of wells (232) on an outer surface; and a ring member (24) including a central hole (241), a plurality of latches (242) on a bottom, a plurality of projections (243) on a top, and a plurality of recesses (244) alternating with the projections (243) and being complimentary to the projections (243) respectively; the latches (242) are fastened in the wells (232) to fasten the hollow half spherical element (23), the hollow half spherical member (25), and the ring member (24) together; and the first and second pad members (21, 22) are configured to separate from each other and place below a rear end of a bottom of a notebook computer (5), the tablet computer (6), or the mobile phone (7) so as to tilt the notebook computer (5), the tablet computer (6), or the mobile phone (7).

\* \* \* \* \*